(12) United States Patent
Brabant et al.

(10) Patent No.: US 7,376,771 B1
(45) Date of Patent: May 20, 2008

(54) GENERIC INTERFACE FOR OPERATING MODES OF MODULES

(75) Inventors: Richard Brabant, Roseville, CA (US); Jonathan Watts, Folsom, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 236 days.

(21) Appl. No.: 11/104,547

(22) Filed: Apr. 13, 2005

(51) Int. Cl.
*G06F 13/38* (2006.01)

(52) U.S. Cl. ......................................... 710/63; 710/110
(58) Field of Classification Search ................. 710/23, 710/26–28, 39, 59, 62–64, 104, 110, 306, 710/308, 311; 711/2, 6, 200, 211, 170
See application file for complete search history.

(56) References Cited

U.S. PATENT DOCUMENTS

| | | | | |
|---|---|---|---|---|
| 4,785,394 A | * | 11/1988 | Fischer | 710/114 |
| 5,434,862 A | * | 7/1995 | Lokhoff | 370/475 |
| 6,231,285 B1 | * | 5/2001 | Elwell et al. | 410/107 |
| 6,385,128 B1 | * | 5/2002 | Arcoleo et al. | 365/233 |
| 6,889,284 B1 | * | 5/2005 | Nizar et al. | 710/315 |
| 6,898,648 B2 | * | 5/2005 | LaBerge | 710/100 |
| 6,963,949 B2 | * | 11/2005 | Ryan | 711/1 |
| 6,981,089 B2 | * | 12/2005 | Dodd et al. | 710/308 |

* cited by examiner

*Primary Examiner*—Khanh Dang

(57) ABSTRACT

A generic interface for a module, method of providing a generic interface, and a module controller system providing a register slave having a generic interface are described. The interface includes an addressable interface, a control interface, and a module interface configured to interact with two or more module configurations. The interface has multiple operating modes at least one of which includes a monitor mode. The method includes receiving an address from a register master identifying the module address to be monitored, reading the received module address content from the module, and transmitting the read content to the monitor port. The system includes a register master, a register slave connected with the register master and adapted to connect with the module, and a monitor port connected with the register slave to receive the monitored module address contents. The register slave configured to interact with two or more module configurations and having a monitor mode for monitoring a specified module address.

21 Claims, 8 Drawing Sheets

GENERIC INTERFACE FOR OPERATING MODES OF MODULES

FIELD OF THE INVENTION

The present invention relates to a generic interface for operating modes of modules.

BACKGROUND

Microprocessors often include modules for storing instructions and data and/or for operating on instructions and data. The modules include storage or memory modules and functional modules. Memory modules include registers, random access memory, read only memory, etc. Functional modules include counters, finite state machines, output of logic functions, etc. The microprocessor accesses the modules through the use of a control system including a register master connected with one or more register slaves. One or more of the register slaves are associated with, and provide the microprocessor interface to, a module. That is, the microprocessor transmits an address to the register master and specifies whether a read of data located at the provided address is to be performed or a write of data provided by the microprocessor to the provided address is to be performed. The register master communicates this information to the register slave.

The register slave then requests an access to a particular location, e.g., a memory location if the module is a memory module, a logic function if the module is a functional module, specified by the provided address. The access type is specified by a read or write control signal. The register slave interface with the module varies based on the control signals, i.e., the control and data signals transmitted across the register slave-module interface varies depending on the module to which the register slave is interfaced.

In many cases the module access is partitioned into two separate pieces: a master component such as the register master and a slave component such as the register slave. The master component handles interfacing with the microprocessor bus. The slave component is custom configured for each particular module type and handles interfacing with the module. The master component communicates with the slave component using a particular protocol, i.e., timing and order of data and control signals. Each module to be addressed under previous approaches requires design and testing of a new interface between the microprocessor, register master, slave component, and module. Further, for each new module to be interfaced with a microprocessor, design and testing of a corresponding slave component is required. That is, each slave component interface with the master component and the module is designed anew for each new module to which the slave component is interfaced.

Designing anew or redesigning the slave component for each new module incurs increased development time and cost. Further, testing requirements are increased for both functionality (correctness), timing, and corner case condition detection and correction. Further still, increased testing and development frequently requires increased time and cost related to updating testing tools and procedures to account for a new design. Further still, in order to obtain additional functional capabilities in a new design, e.g., testability, additional design and development costs are incurred.

SUMMARY

An apparatus embodiment of a generic interface for a module includes an addressable interface, a control interface, and a module interface configured to interact with two or more module configurations. The interface has multiple operating modes at least one of which includes a monitor mode.

A method embodiment of providing a generic interface for a module, where the generic interface is connected with the module, a register master, and a monitor port, the generic interface having multiple operating modes, includes receiving an address from the register master identifying the module address to be monitored, reading the received module address content from the module, and transmitting the read content to the monitor port.

A system embodiment of a module interface providing a register slave having a generic interface for a module, where the register slave has multiple operating modes, includes a register master, a register slave connected with the register master and adapted to connect with the module, a monitor port connected with the register slave to receive the monitored module address contents. The register slave is configured to interact with two or more module configurations and have a monitor mode for monitoring a specified module address.

Construction and operation of embodiments according to the present invention will become readily apparent to those skilled in the art from the following detailed description, wherein the embodiments are shown and described, simply by way of illustration of the best mode contemplated of carrying out the invention. As will be realized, the invention is capable of other and different embodiments, and its several details are capable of modifications in various obvious respects, all without departing from the invention.

DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION

Figure 1:
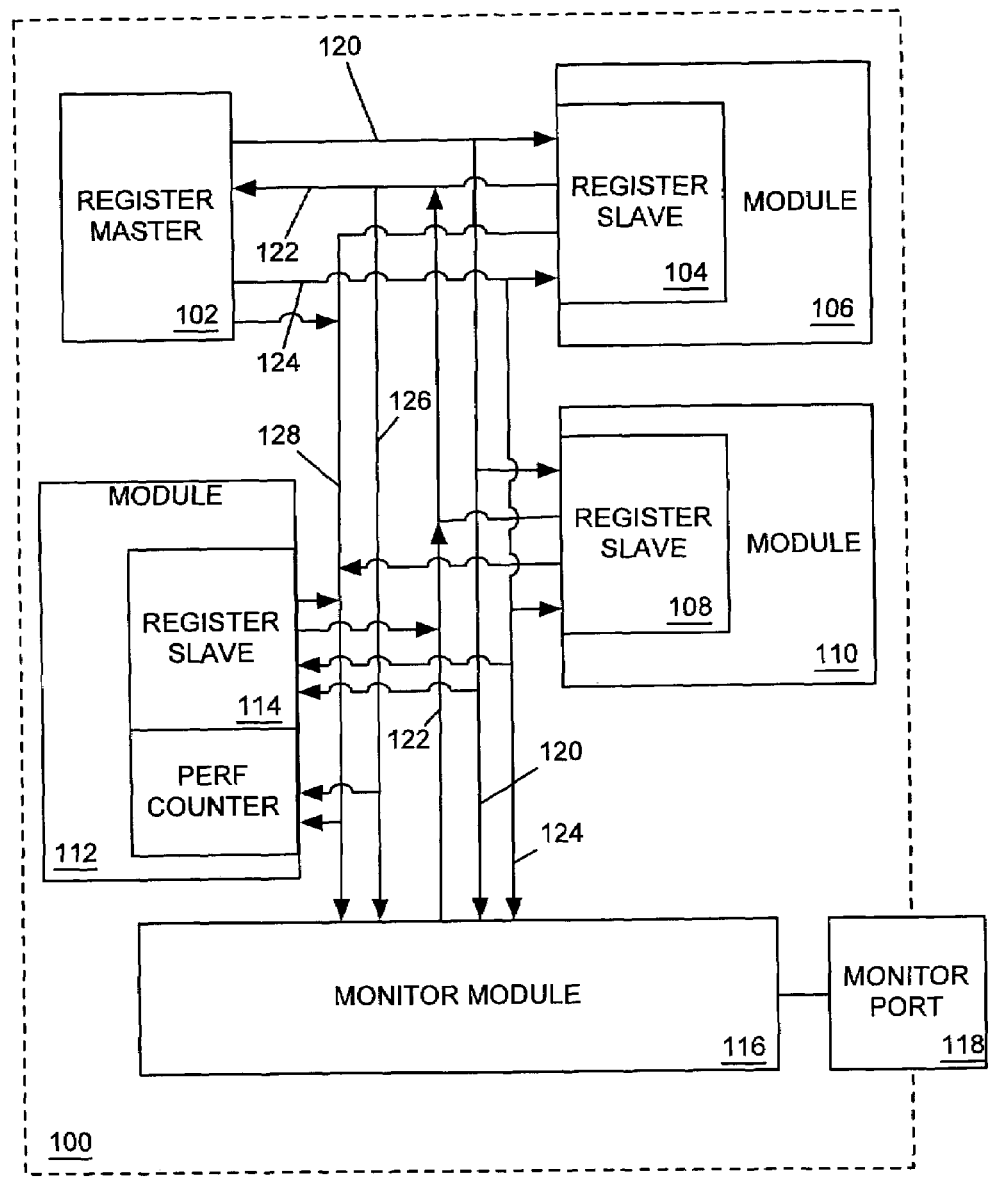
FIG. 1 is a high level block diagram of a portion of an embodiment of the present invention.

FIG. 1 depicts a high level block diagram of a portion of a microprocessor 100. Various components are provided on microprocessor 100 including a register master 102, a register slave 104, a module 106, a second register slave 108, a second module 110, a third module 112, a third register slave 114, and a monitor module 116. Register slave 104 is designed to provide a generic interface for module 106.

Second register slave 108 and third register slave 114 are identical to register slave 104; however, the second and third register slaves may differ in terms of the connection with and interaction with second module 110 and third module 112 in accordance with the below description of embodiments according to the present invention. For ease of description, register slave 104 will be primarily described below.

Register master 102 interacts with other components of microprocessor 100 including register slaves 104, 108, and 114, monitor module 116, and a central processing unit among others. Register master 102 reads and writes data received from the CPU (not shown) to/from a specified location in a module 106, 110, 112. Register master 102 transmits a read/write request from the CPU to the modules 106, 110, and 112. The transmitted read/write request includes an address specifying a location as well as an indication of whether the request is a read or a write of data. If register master 102 requests writing of data, the read/write request further includes the data to be written to the address. Additionally, additional control signals are transmitted from register master 102 to modules 106, 110, and 112 for controlling the operation of the included register slaves 104, 108, and 114. For example, one such control signal causes a register slave (104, 108, and 114) to begin monitoring a particular address in the connected module (106, 110, and 112).

According to an embodiment, during register slave 104 monitoring of a particular address in a connected module 106, the read content of the address is continuously monitored by the register slave in order to provide observability within the module. For example, monitoring by register slave 104 may provide insight into not only memory location contents, but also to data and other information regarding the operation, status, etc. internal to modules including logic functions. As described below, register slave 104 provides monitored data to monitor module 116.

Module 106 is a module, e.g., a memory storage medium such as a random access memory (RAM) or a read only memory (ROM), registers, counters, and other types of storage and logic gates, in communication with register master 102 via register slave 104 to which data is read and written by the CPU during execution.

Module 106 interacts with the CPU via register master 102 and register slave 104. As described above with respect to register master 102, the register master exchanges signals with module 106. In particular, register master 102 exchanges signals with register slave 104 which is coupled with and forms a part of module 106. In an embodiment, register slave 104 forms the interface for module 106 to communicate with additional components of microprocessor 100. In another embodiment, register slave 104 is a component separate from, but connected with, module 106 and forming the interface for the module.

In one embodiment, third module 112 monitors events from a given memory location passing along first monitor channel bus 126 and second monitor channel bus 128 (described below). In this manner, third module 112 functions as a counter based on the content of the channel (126, 128).

Monitor module 116 connects with register master 102, module 106 (via register slave 104), second module 110 (via second register slave 108), and third module 112 (via third register slave 114). Monitor module 116 connects with an output port 118 of microprocessor 100 in order to enable monitoring of the contents of a memory location in one of modules 106, 110, and 112.

A master/slave (M/S) bus 120 interconnects register master 102 with register slave 104, second register slave 108, third register slave 114, and monitor module 116 thereby enabling the transfer of data from the register master to the other components 104, 108, 114, and 116. The data passed along the M/S bus 120 includes addressing, data to be written, and control information, e.g., a read/write signals, etc.

A read data bus 122 connects register slave 104, second register slave 108, and third register slave 114 to register master 102 and monitor module 116 thereby enabling the transfer of read data from modules 106, 110, 112 to the register master and the monitor module. The data passed along read data bus 122 includes data read from a memory location in one of modules 106, 110, 112.

A monitor control bus 124 connects register master 102 with register slave 104, second register slave 108, third register slave 114, and monitor module 116 to allow the register master to transmit monitor control signals to the register slaves and to the monitor module. The monitor control signals are used to control addressing information transmitted from a register slave 104, 108, 114 to a module 106, 110, 112, as described below in detail. If one of the register slaves 104, 108, 114 is monitoring a memory location and one of the modules 106, 110, 112 and providing this information to monitor module 116 via read data bus 122, monitor control bus 124 provides a mechanism to enable/disable such monitoring by a register slave.

A first monitor channel bus 126, shared with read data bus 122, provides data from read data bus 122 to monitor module 116 and thereby to output port 118. Monitoring of data along first monitor channel bus 126 is altered upon a CPU-based read occurrence from register master 102 as the CPU-based read is a higher priority. In accordance with an embodiment, register master 102 performs only a single read or write at a time, e.g., only a single module 106, 110, or 112 is read or written.

A second monitor channel bus 128 provides monitored data from register slave 104, second register slave 108, third register slave 114, and register master 102. In an embodiment, second monitor channel bus 128 provides monitored data from register slave 104, 108, 114 by transferring monitor data to the monitor module 116. In accordance with an embodiment, a single module may be monitored per monitor channel bus 126, 128.

Figure 2:
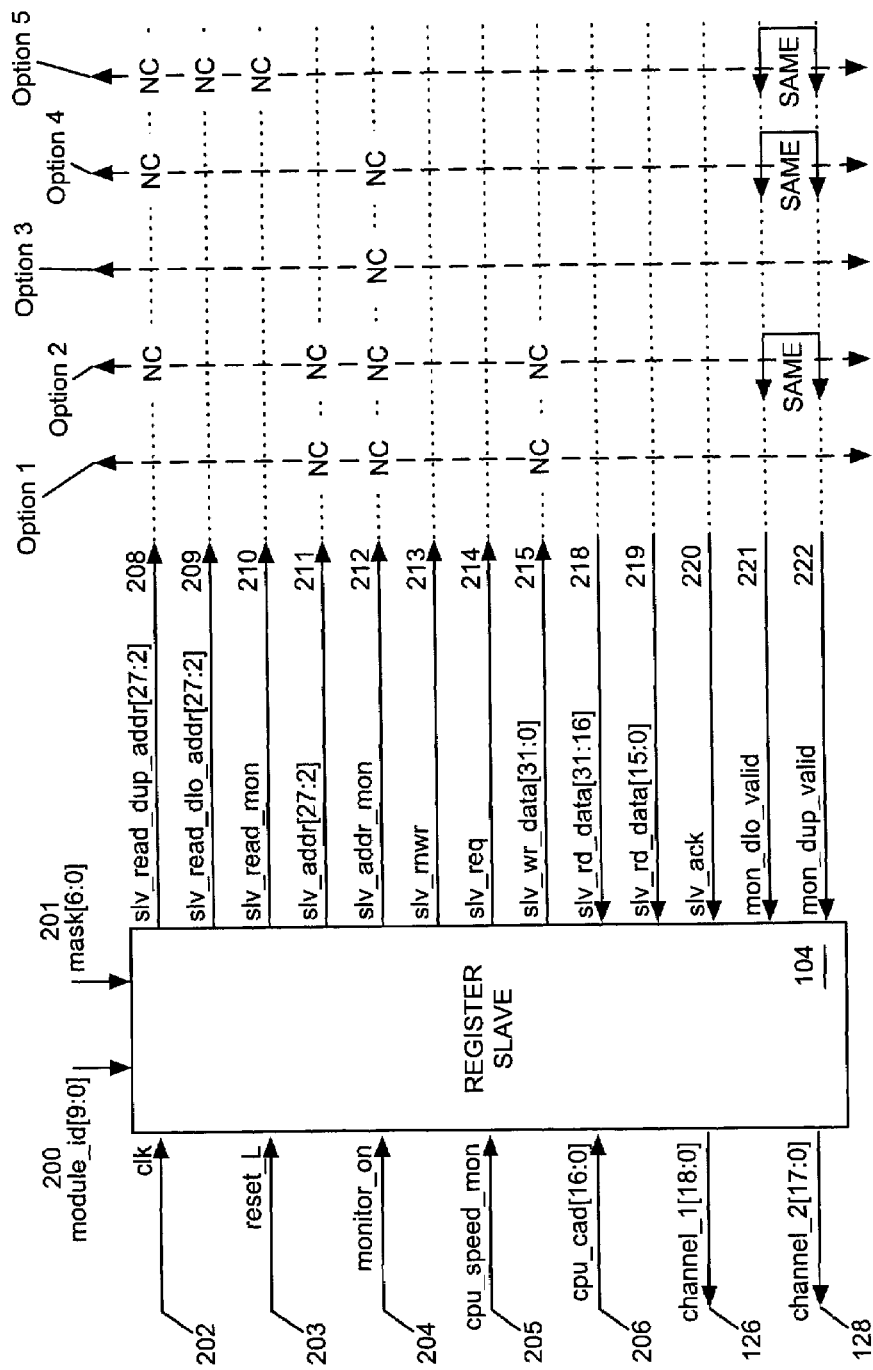
FIG. 2 is a high level interface diagram of a register slave of FIG. 1 according to an embodiment of the present invention.

FIG. 2 depicts a high-level input/output diagram of register slave 104, as well as indicating five interconnection options for connecting between register slave 104 and module 106. Each of the five interconnection options will be described in further detail below; however, it is to be understood that combinations of the input and output connections identified in FIG. 2 may result in more than five interconnection options.

As depicted in FIG. 2, register slave 104 receives the following input signals: a module identifier input, e.g., module id[9:0] 200, a mask input, e.g., mask[6:0] 201, a clock input, e.g., clk 202, a reset input, e.g., reset_L 203, a 'monitor on' input, e.g., monitor_on 204, a CPU speed monitor input, e.g., cpu_speed_mon 205, and a CPU command, address, and data (CAD) input, e.g., cpu_cad[16:0] 206. Specifically, 'monitor on' input 204, CPU speed monitor input 205, and CPU CAD input 206 transfer over M/S bus 120 from register master 102 (FIG. 1) to register slave 104. The module identifier input 200 is a unique module id number identifying the module 106 and provides an identifier of the module connected to the register slave from the module to the register slave. For example, module identifier input 200 may specify a range of addresses for which addresses the module is responsible.

Mask input 201 enables handling modules of different size and/or addressing ranges. In combination with module identifier input 200, mask input 201 enables divvying up the addressing space among multiple modules.

Reset line 203 causes a reset of the register slave 104. In one embodiment, reset line 203 is always asserted and causes a reset if driven low.

Register slave 104 transmits monitor data via first and second monitor channel buses 126, 128 (FIG. 1). Monitor data includes data stored in a particular memory location of module 106 connected to register slave 104. In one embodiment, register slave 104 includes a storage mechanism, e.g., a buffer, for storing data received from a monitored location of module 106.

Turning now to the interface with module 106, register slave 104 transmits the following output signals to the module: an upper read address, e.g., slv_read_dup_addr[27:2] 208, a lower read address, e.g., slv_read_dlo_addr[27:2] 209, a slave read monitor signal, e.g., slv_read_mon 210, an address, e.g., slv_addr[27:2] 211, an address monitor, e.g., slv_addr_mon 212, a read not write (RNWR) signal, e.g., slv_rnwr 213, a slave request, e.g., slv_req 214, and a write data signal, e.g., slv_wr_data[31:0] 215. Register slave 104 receives the following input signals from module 106: a first read data input, e.g., slv_rd_data[31:16] 218, a second read data input, e.g., slv_rd_data[15:0] 219, an acknowledgement input, e.g., slv_ack 220, a monitor lower valid input, e.g., mon_dlo_valid 221, and a monitor upper valid input, e.g., mon_dup_valid 222.

A further description of each of the above-identified signals is now provided. The output signals from register slave 104 to module 106 are addressed first. Upper read address 208, lower read address 209, and address 211 are all signals indicating specific location to be read/written from/to in module 106. Write data signal 215 is the data to be written to the specified module location, i.e., as specified using address 211.

Figure 8:
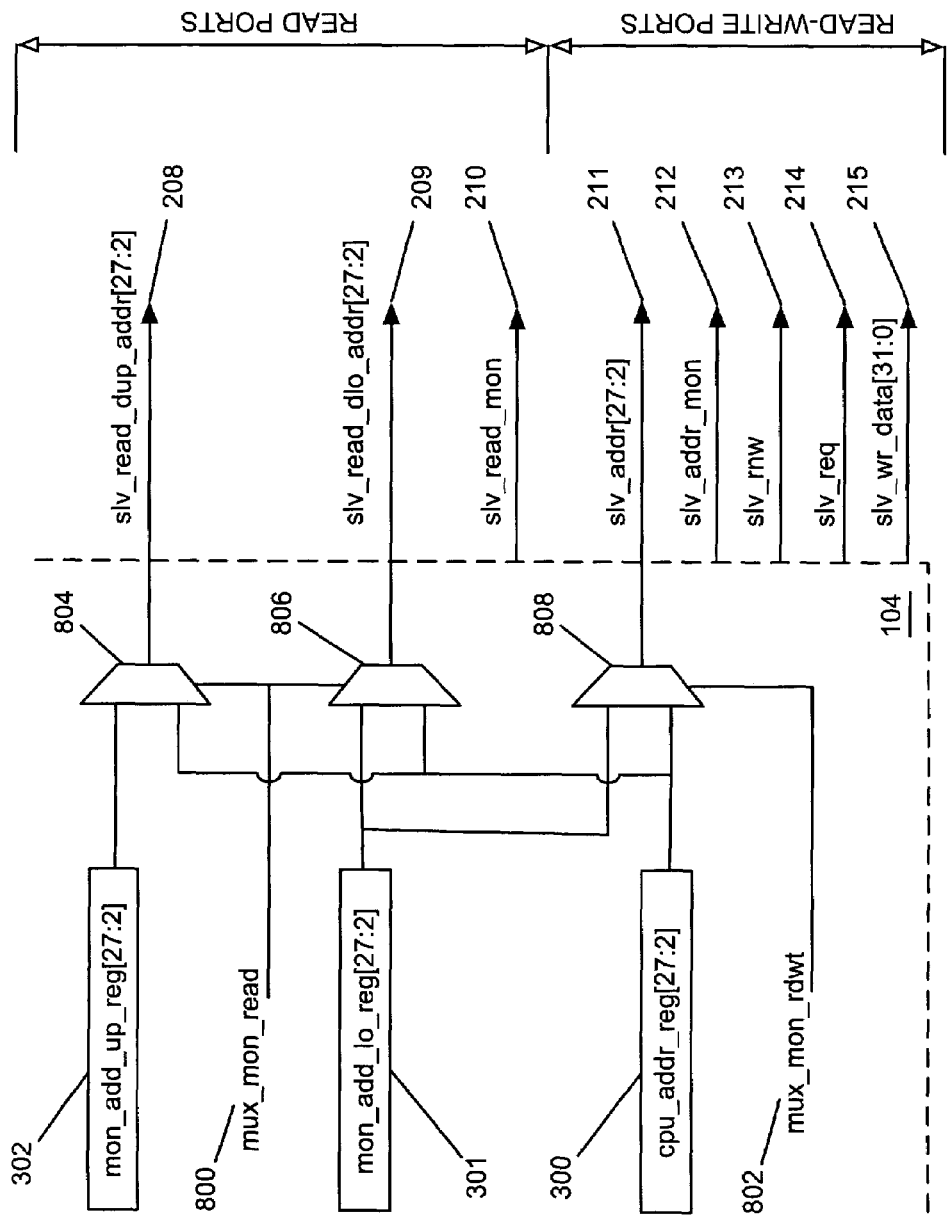
FIG. 8 is a high level logic diagram of an addressing mechanism according to an embodiment of the present invention.

FIG. 8, described in more detail below, depicting a high level logic diagram of an addressing mechanism according to an embodiment is referred to in conjunction with the description of FIG. 2. Register master 102 provides desired address locations of module 106 to be monitored via monitored address registers, e.g., mon_add_lo_reg 301 (FIG. 8) and a second monitored address, e.g., mon_add_up_reg 302 (FIG. 8). For example, CPU (not shown) specifies via register master 102 which address locations in module 106 are to be monitored. Similarly, register master 102 stores an address to be read/written in address register 300 (FIG. 8).

RNWR signal 213 and slave request 214 are shared and common to different types of module 106. On a CPU write, address signal 211, address monitor signal 212, and write data signal 215 provide the CPU write data if upper read address 208 lower read address 209, and slave read monitor signal 210 are either inactive or driving the monitor needed signals if 'monitor on' input signal 204 is true. On a CPU read, upper read address 208, lower read address 209, slave read monitor signal 210, address signal 211, address monitor signal 212, and write data signal 215 provide the CPU read data. On a CPU write, the read-write ports (FIG. 8) are affected, as described above. On a CPU read, the 2 sets of ports: read and read-write (FIG. 8) are affected, as described above.

The register slave contains a sequencer, e.g., a finite state machine (not shown), defining the series of events with the appropriate controls for supporting different possible states of the interface of register slave 104 to module 106: a 'totally inactive' state; an 'only monitoring data' state; a 'CPU write without monitoring on' state; a 'CPU read without monitoring on' state; a 'CPU write with monitoring on' state and a 'CPU read with monitoring on' state. In an embodiment, these 6 different states describe the entire needed functionality of the register slave 104 and module 106 interface.

Each of the above-listed states is now described with respect to the status of particular signals on the register slave 104 and module 106 interface. True and false signal designations indicate assertion or de-assertion of the particular signal, respectively. In the 'totally inactive' state, slave request 214, address monitor 212 and read monitor 210 signals are false.

In the state of 'only monitoring data', slave request 214 is false, address monitor 212 and read monitor 210 are both true, address bus 211 and lower read address 209 drive the data contained in the address low register 301, and upper read address 208 drives the data contained in the address up register 302.

In the 'CPU write without monitoring on' state, slave request 214 is true, RNWR signal 213 is false, address monitor 212 and read monitor 210 are both false, address bus 211 drives the data contained in address register 300, and write data bus 215 drives the data to be written in module 106.

In the 'CPU read without monitoring on' state, slave request 214 is true, RNWR signal 213 is true, address monitor 212 and read monitor 210 are both false, address busses 211, 208 and 209 drive the data contained in address register 300, and write data bus 215 is inactive.

In the 'CPU write with monitoring on' state, slave request 214 is true, RNWR signal 213 is false, upper address 208 drives the data contained in the address up register 302, lower address 209 drives the data contained in the address low register 301, read monitor 210 is true, address monitor 212 is false, address bus 211 drives the data contained in address register 300, and write data bus 215 drives the data to be written in the module 106.

In the 'CPU read with monitoring on' state, slave request 214 is true, RNWR signal 213 is true, address monitor 212 and read monitor 210 are both false, address busses 211, 208 and 209 drive the data contained in address register 300, and write data bus 215 is inactive.

Slave read monitor signal 210, address monitor 212, RNWR signal 213, and slave request 214 all work together to specify the monitoring status and/or CPU access of register slave 104 in combination with module 106. Slave read monitor signal 210 specifies whether the address provided by upper read address 208, and lower read address 209 are module locations requested to be monitored. Address monitor 212 specifies whether the address 211 is a module location requested to be monitored. If address monitor 212 is asserted (or true), then the address provided is a monitored address. In an embodiment, if 'monitor on' input 204 is true and there is no CPU access to module 106, 110, the different monitored address busses 208, 209 are constantly updated with the contents of their respective monitored address registers 301, 302.

RNWR signal 213 specifies whether a particular CPU signal provided address (specified in conjunction with address monitor 212 and read monitor 210) is a read and not a write signal for a particular module location. Slave request 214 specifies whether a particular access of module 106 is a CPU-based access (if asserted or true)

We turn now to the input signals received by register slave 104 from module 106. First read data input 218 and second read data input 219 are respectively the upper half-word and the lower half-word of the data stored at 1 or 2 specific module location(s) in module 106 as specified by the addresses transmitted from the register slave. First read data input 218 and second read data input 219 are subsequently provided by register slave 104 to monitor channel bus 126 and monitor channel bus 128. Module 106 transmits acknowledgement input 220 to register slave 104 in response to a CPU access of a specific location of a module 106 by the register slave. Module 106 transmits a monitor lower valid input 221 and a monitor upper valid input 222 to indicate the validity of monitored data provided to register slave 104 via first read data input 218 and second read data input 219. For example, if data provided by module 106 via first read data input 218 and second read data input 219 is provided in response to a CPU-based access of the module, then each of the monitor lower valid input 221 and monitor upper valid input 222 is not asserted or set to indicate false.

The configuration of signals specified in each of the options 1-5 of FIG. 2 enables the CPU reading and writing of data to a specified address of module 106 while preserving the ability to monitor the data at an address in the module. Register slave 104 operates independent of the particular implementation (options 1-5) of module 106 and passes along data (received via first read data 218 and/or second read data 219), acknowledgement input 220 and monitor validity (monitor lower valid input 221 and monitor upper valid input 222).

If register slave 104 is monitoring a particular module 106 address, one or both of first and second monitor channel buses 126, 128 provide the contents of the monitored module address(es) to monitor module 116. In order for register slave 104 to be monitoring 1 or 2 module locations, first the 2 address registers up 302 and low 301 must be set-up appropriately by a CPU write of information to the registers, then CPU CAD input 206 asserts 'monitor on' input 204 (or true) to register slave 104. Responsive to receiving the signal monitor on input 204 true, register slave 104 asserts slave read monitor signal 210, address monitor 212, and provides the address to monitored upper read address 208, lower read address 209, and address 211.

If register slave 104 is monitoring a particular module 106 address and the CPU attempts to perform a read from module 106, the register slave halts monitoring and presents the CPU-based read address to the module. Further specifically, register slave 104 deasserts slave read monitor signal 210, address monitor 212, asserts RNWR signal 213, slave request 214, and provides the CPU-based address to upper read address 208, lower read address 209, and address 211.

After reading of the CPU-based address is complete, register slave 104 resumes monitoring as described above.

With respect to each of the options depicted in FIG. 2, unless specified by a not connected (NC) symbol in the particular option column the module supports the reading and/or writing of the corresponding signals to/from register slave 104. The "same" symbol with respect to options 1, 2, and 3 indicates that the same signal is transmitted from module 106 to register slave 104.

Figure 3:
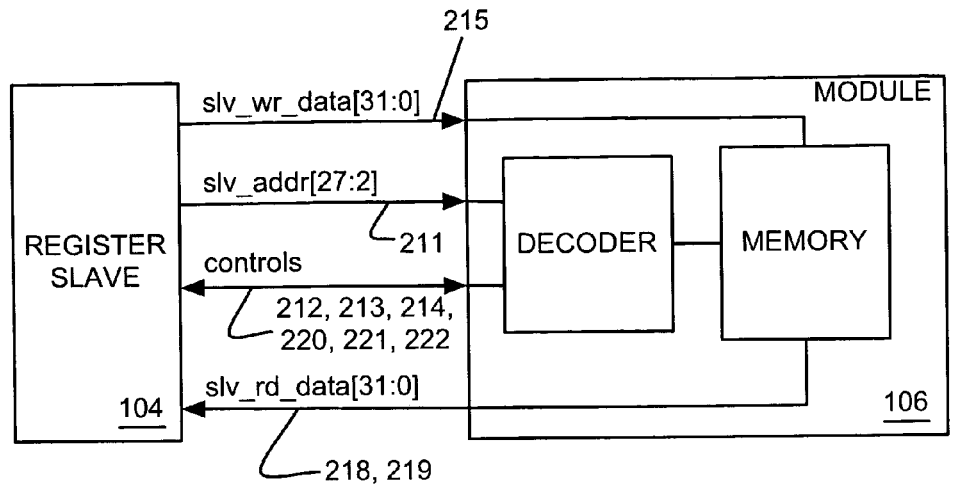
FIG. 3 is a high level interface diagram of a register slave and memory interface according to a first option of FIG. 2 according to an embodiment of the present invention.

FIG. 3 depicts the interaction between register slave 104 and module 106 according to the first option of FIG. 2. The first option is a single address read/write bus implementation of module 106. As depicted in FIG. 3, module 106 includes an address decoder receiving and decoding address signal, e.g., slv_addr[27:2] 211, from register slave 104. In an embodiment, controls line is used to transfer address monitor, e.g., slv_addr_mon 212, RNWR, e.g., slv_mwr signal 213, and slave request, e.g., slv_req 214 (FIG. 2) from register slave 104 to module 106 and to transfer acknowledgement input, e.g., slv_ack 220, monitor lower valid input, e.g., mon_dlo_valid 221, and monitor upper valid input, e.g., mon_dup_valid 222, from the module to the register slave. Slave read data, e.g., slv_rd_data[31:16] 218 and slv_rd_data[15:0] 219 signals are transferred from module 106 to register slave 104.

Figure 4:
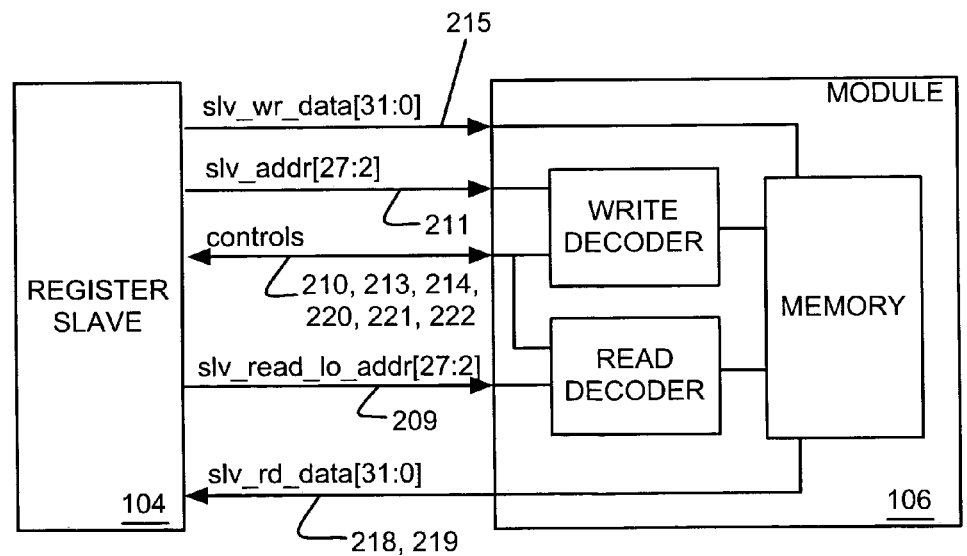
FIG. 4 is a high level interface diagram of a register slave and memory interface according to a second option of FIG. 2 according to an embodiment of the present invention.

FIG. 4 depicts the interaction between register slave 104 and module 106 according to the second option of FIG. 2. The implementation of module 106 according to the second option includes two independent address read bus and address write bus interfaces. As depicted in FIG. 4, module 106 includes separate read and write decoders such that the write decoder receives address signal, e.g., slv_addr[27:2] 211 and the read decoder receives lower read address, e.g., slv_read_lo_addr[27:2] 209 from register slave 104. In an embodiment, controls line is used to transfer slave read monitor signal, e.g., slv_read_mon 210, RNWR signal, e.g., slv_mwr 213, and slave request, e.g., slv_req 214 (FIG. 2) from register slave 104 to module 106 and to transfer acknowledgement input, e.g., slv_ack 220, monitor lower valid input, e.g., mon_dlo_valid 221, and monitor upper valid input, e.g., mon_dup_valid 222 from the module to the register slave.

Figure 5:
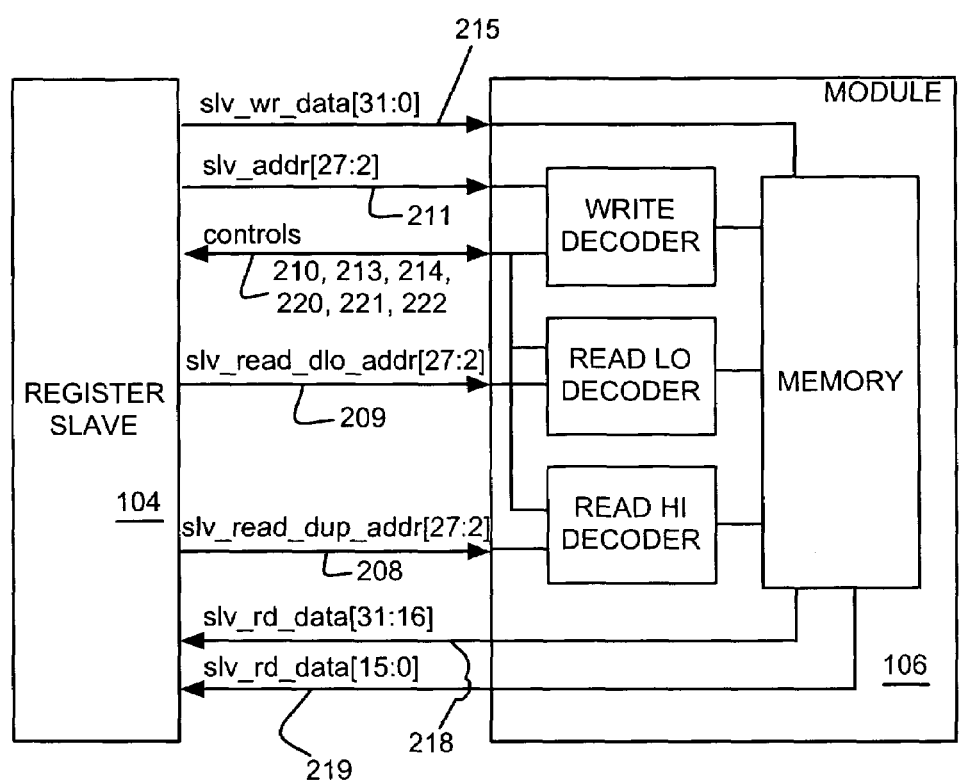
FIG. 5 is a high level interface diagram of a register slave and memory interface according to a third option of FIG. 2 according to an embodiment of the present invention.

FIG. 5 depicts the interaction between register slave 104 and module 106 according to the third option of FIG. 2. The implementation of module 106 according to the third option includes a split read data bus having two independent read address bus interfaces. As depicted in FIG. 5, module 106 includes not only separate read and write decoders, but the read decoder is further divided into separate upper and lower read decoders. Lower read decoder receives lower read address 209 and upper read decoder receives upper read address 208 from register slave 104. Additionally, according to the FIG. 5 embodiment, first read data input, e.g., slv_rd_data[31:16] 218 and second read data input, e.g., slv_rd_data[15:0] 219 are used to provide data read from module 106 to register slave 104. In an embodiment, controls line is used to transfer slave read monitor signal, e.g., slv_read_mon 210, RNWR signal, e.g., slv_mwr 213, and slave request, e.g., slv_req 214 (FIG. 2) from register slave 104 to module 106 and to transfer acknowledgement input, e.g., slv_ack 220, monitor lower valid input, e.g., mon_dlo_valid 221, and monitor upper valid input, e.g., mon_dup_valid 222 from the module to the register slave.

Figure 6:
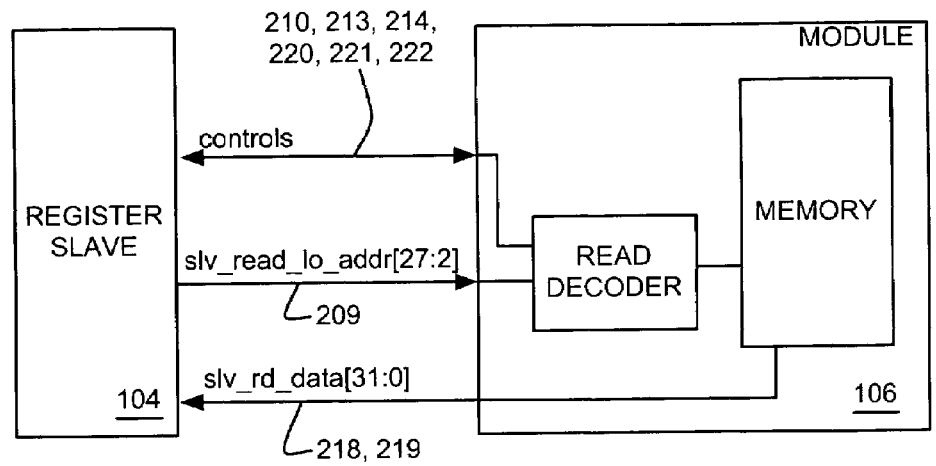
FIG. 6 is a high level interface diagram of a register slave and memory interface according to a fourth option of FIG. 2 according to an embodiment of the present invention.

FIG. 6 depicts the interaction between register slave 104 and module 106 according to the fourth option of FIG. 2. The implementation of module 106 according to the fourth option includes a non-writable memory having a single address read bus interface. As depicted in FIG. 6, module 106 includes a single read decoder receiving lower read address, e.g., slv_read_dlo_addr[27:2] 209 from register slave 104. In an embodiment, controls line is used to transfer slave read monitor signal, e.g., slv_read_mon 210, RNWR signal, e.g., slvmmwr 213, and slave request, e.g., slv_req 214 (FIG. 2) from register slave 104 to module 106 and to transfer acknowledgement input, e.g., slv_ack 220, monitor lower valid input, e.g., mon_dlo_valid 221, and monitor upper valid input, e.g., mon_dup_valid 222 from the module to the register slave.

Figure 7:
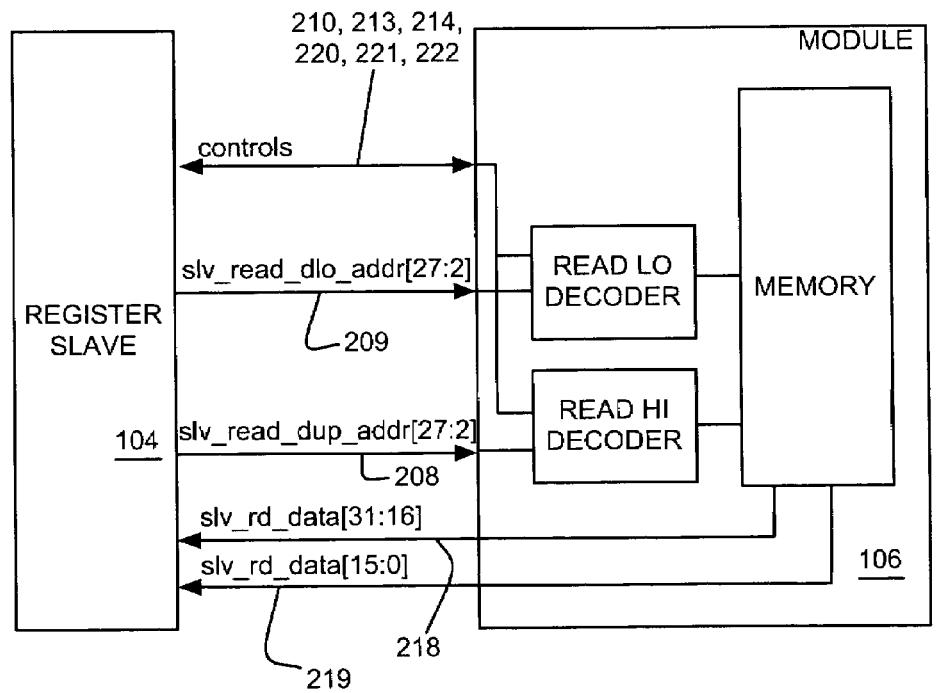
FIG. 7 is a high level interface diagram of a register slave and memory interface according to a fifth option of FIG. 2 according to an embodiment of the present invention.

FIG. 7 depicts the interaction between register slave 104 and module 106 according to the fifth option of FIG. 2. The implementation of module 106 according to the fifth option includes a non-writable memory having a split read data bus with two independent address read buses. As depicted in FIG. 7, module 106 includes separate upper and lower read decoders receiving upper read address, e.g., slv_read_dup_addr[27:2] 208 and lower read address, e.g., slv_read_dlo_addr[27:2] 209, respectively. Module 106 provides data to register slave 104 via first read data input 218 and second read data input 219. In an embodiment, controls line is used to transfer slave read monitor signal, e.g., slv_read_mon 210, RNWR signal, e.g., slv_mwr 213, and slave request, e.g., slv_req 214 (FIG. 2) from register slave 104 to module 106 and to transfer acknowledgement input, e.g., slv_ack 220, monitor lower valid input, e.g., mon_dlo_valid 221, and monitor upper valid input, e.g., mon_dup_valid 222 from the module to the register slave.

Figure 9:
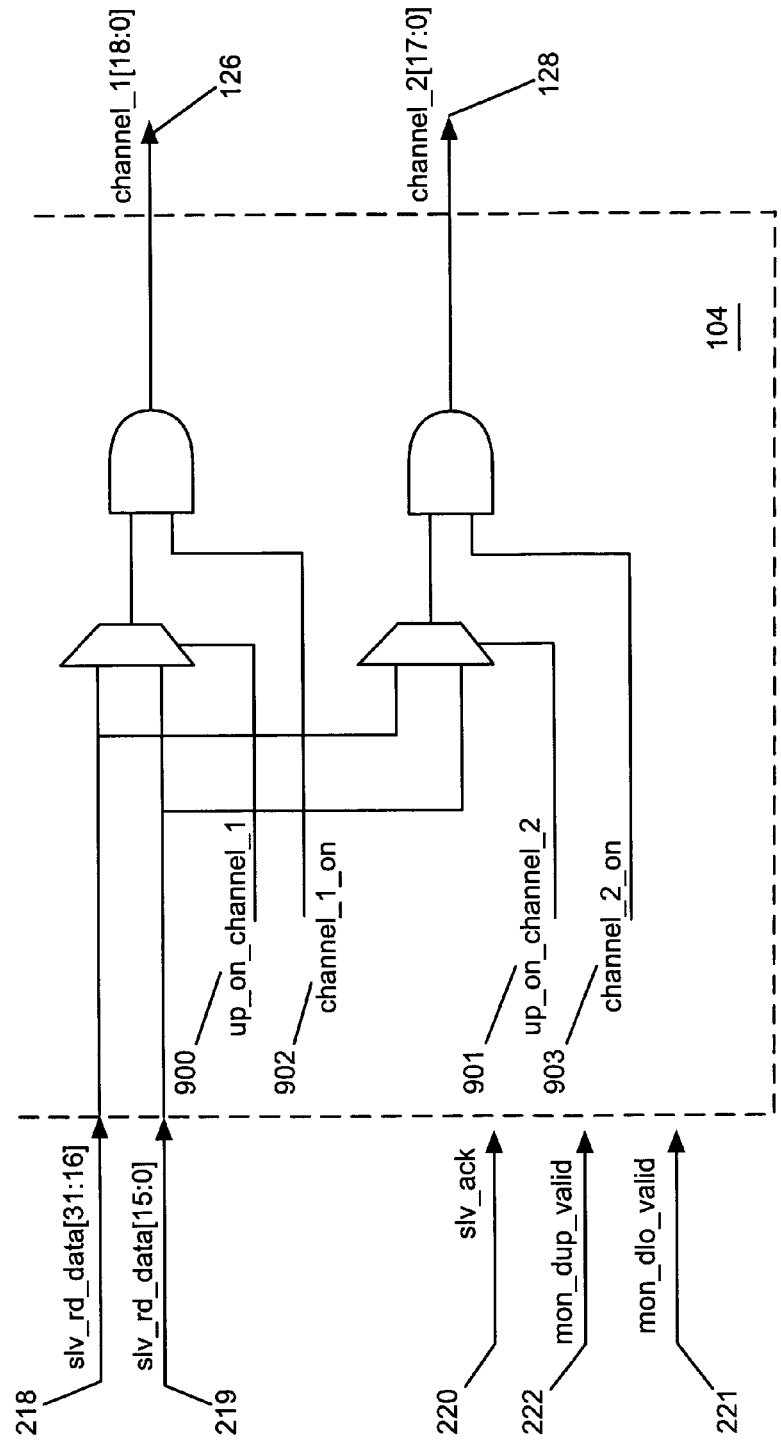
FIG. 9 is a high level logic diagram of a data mechanism according to an embodiment of the present invention.

FIGS. 8 and 9 depict high-level logic diagrams of the determination of address and data transmissions from register slave 104 to module 106. With particular reference to FIG. 8, multiplex monitor read signal 800 specifies a CPU-based read access of module 106. Multiplex monitor RDWRT signal 802 specifies a CPU-based read/write access of module 106. Multiplex monitor read signal 800 determines whether monitored data, e.g., specified by an address stored in mon_add_up_jeg 302, or a CPU-based memory location read data, e.g., cpu_addr_reg 300, is transferred via multiplexer 804 from register slave 104, e.g., via slv_read_dup_addr 208, and similarly with respect to multiplexer 806 with respect to mon_add_lo_reg 301 and cpu_addr_reg 300. Multiplex monitor RDWRT signal 802 controls multiplexer 808 to determine whether to transfer monitored data, e.g., specified by an address stored in mon_add_lo_reg 301, or a CPU-based memory location read data, e.g., cpu_addr_reg 300, via slv_addr signal 211.

FIG. 9. depicts signaling used in transferring data via register slave 104 to the first and second channel monitor buses 126, 128. In particular, the slv_ack signal (acknowledgement input 220 of FIG. 2 from module 106) indicates that read data on the read data bus, e.g., slv_rd_data[31:16] 218 and slv_rd_data[15:0] 219, matches the requested CPU-based memory read location. When monitoring is active the mon_dup_valid (upper monitor valid input 222 of FIG. 2) is high (asserted) for the upper half word of data including valid monitor data, e.g., slv_rd_data[31:16] 218 and respectively the mon_dlo_valid (lower monitor valid input 221 of FIG. 2) is high (asserted) for the lower half-word of data including valid monitor data, e.g., slv_rd_data[15:0] 219.

Up_on_channel_1 900 and up_on_channel_2 901 are stored in a control register in register slave 104 and are used to determine which channel, i.e., channel_1 and channel_2 corresponding to first and second monitor channel buses 126 and 128, the data is passed on.

In conjunction with up_on_channel_1 900 and up_on_channel_2 901, channel_1 on 902 and channel_2 on 903 specify the active register_slave 104, 108, 112 for daisy chaining of information transmitted along the channels.

Figure 10:
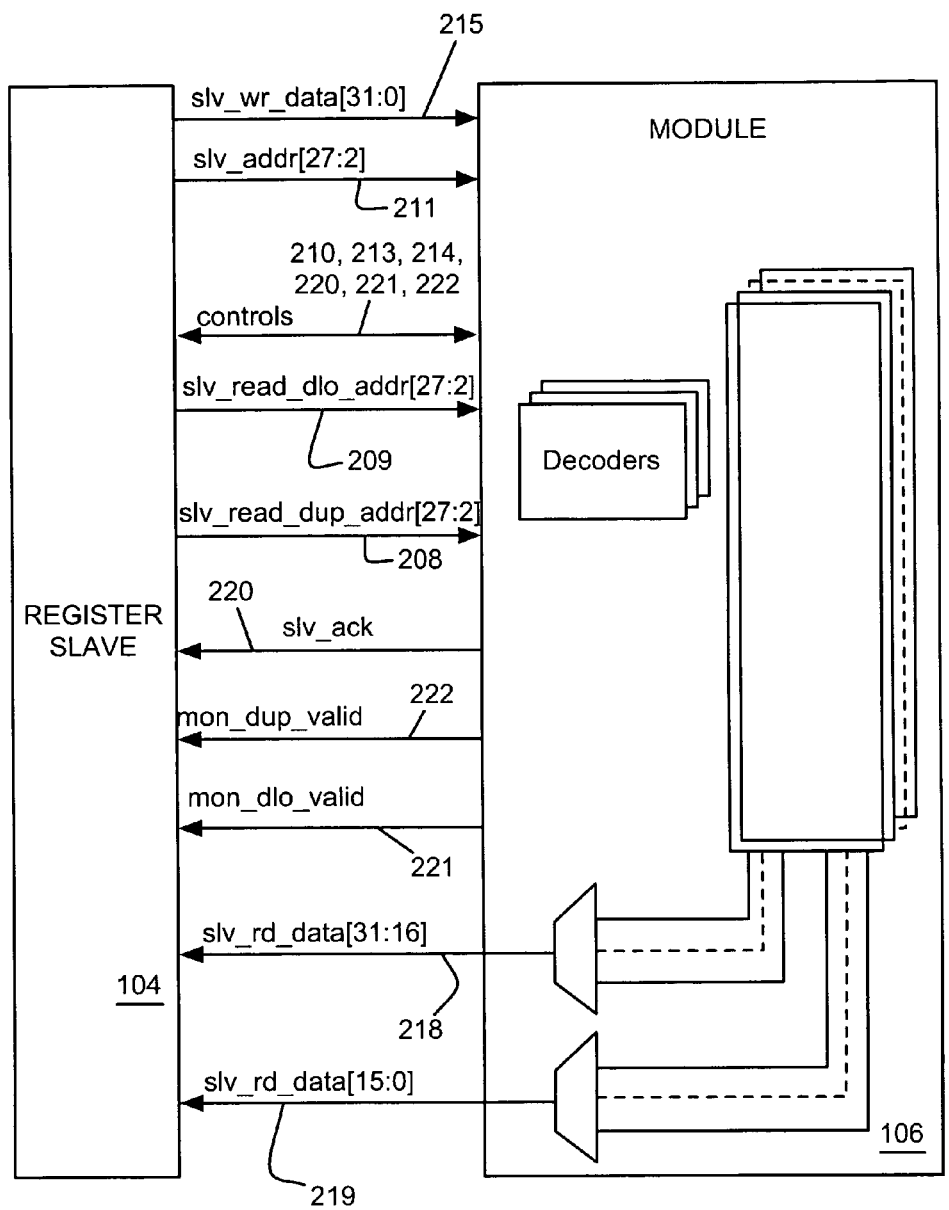
FIG. 10 is a high level block diagram of the register slave of FIG. 2 connected to a heterogeneous module according to an embodiment of the present invention.

FIG. 10 depicts the flexibility of the register slave interface described above. In particular as depicted in FIG. 10, the register slave is able to interface to a module which is a composite of multiple sub-modules. e.g., multiple heterogeneous moduls/sub-modules. The signals depicted as traversing the interface between register slave 104 and module 106 are as described above with respect to FIG. 2.

It will be readily seen by one of ordinary skill in the art that the embodiments fulfills one or more of the advantages set forth above. After reading the foregoing specification, one of ordinary skill will be able to affect various changes, substitutions of equivalents and various other aspects of the embodiments as broadly disclosed herein. It is therefore intended that the protection granted hereon be limited only by the definition contained in the appended claims and equivalents thereof.

What is claimed is:

1. A generic interface for a module, the generic interface comprising:
   a master/slave bus connection arranged to receive from a register master an address of the module at which data is to be monitored;
   a monitor control bus connection arranged to receive a monitor control signal to control monitoring of the module address data by the generic interface;
   a read data bus connection arranged to transmit data monitored by the generic interface from the module address to a monitor port; and
   a module interface configured to interact with two or more module configurations, the module interface arranged to monitor data at the module address responsive to receipt of the monitor control signal by the generic interface,
   wherein the generic interface has multiple operating modes at least one of which includes a monitor mode, wherein the generic interface is arranged to transmit data received from the module interface to the monitor port using the read data bus connection when in the monitor mode.

2. The interface of claim 1, wherein the module is at least one of a register, a counter, a finite state machine, an output of logic function, a read only memory, and a random access memory.

3. The interface of claim 1, wherein the generic interface is arranged to receive a monitor on input signal.

4. The interface of claim 1, wherein the module interface includes a slave read monitor signal interface, an address monitor interface, a read not write signal interface, a slave request interface, and a write data signal interface.

5. The interface of claim 1, wherein the module interface includes a monitor lower valid input interface, and a monitor upper valid input interface.

6. The interface of claim 1, wherein the generic interface is configured to halt a monitor mode and transmit a read address via the module interface after receipt of the read address from the master/slave bus connection.

7. The interface of claim 1, wherein the module interface is configured to interact with at least two of a memory having a single address read/write bus, a memory having two independent address read bus and address write bus interfaces, a memory having a split read data bus having two independent read address bus interfaces, a non-writable memory having a single address read bus interface, and a non-writable memory having a split read data bus with two independent address read buses.

8. The interface of claim 1, the generic interface further comprising a second read data bus connection arranged to transmit data, monitored by the generic interface from a second module address to the monitor port, and
   wherein the generic interface is arranged to transmit data from the second module address received via the module interface to the monitor port if the generic interface is in monitor mode.

9. The interface of claim 1, wherein the generic interface is arranged to transmit the data at the module address repeatedly.

10. The interface of claim 1, wherein the generic interface is arranged to continuously monitor an address of the module during a monitor mode.

11. A method of providing a generic interface for a module, the generic interface connected with the module, a register master, and a monitor port, the generic interface having multiple operating modes, comprising the steps of:
   receiving at the generic interface an address from the register master identifying the module address to be monitored;
   reading the received module address content from the module; and
   transmitting the read content to the monitor port.

12. The method of claim 11, wherein the reading step is performed repeatedly.

13. The method of claim 11, further comprising the steps of:
   receiving an address from the register master identifying a module address to be accessed;
   halting the monitoring read step and accessing the received module address in the module; and
   resuming the reading step.

14. The method of claim 13, wherein the monitoring read step is resumed after completion of accessing the received module address in the module.

15. The method of claim 13, further comprising the step of:
   transmitting the accessed module address content to the register master if the access is a read access.

16. A module controller system providing a register slave having a generic interface for a module, the register slave having multiple operating modes, the system comprising:
   a register master;
   a register slave connected with the register master and adapted to connect with the module, the register slave configured to interact with two or more module configurations, the register slave having a monitor mode for monitoring a specified module address; and
   a monitor port connected with the register slave to receive the monitored module address contents.

17. The system of claim 16, wherein the module is at least one of a register, a counter, a finite state machine, an output of logical function, a read only memory, and a random access memory.

18. The system of claim 16, wherein the register slave monitors a specified module address responsive to receipt of a monitor address from the register master.

19. The system of claim 18, wherein the register slave halts monitoring responsive to receipt of a module access request from the register master.

20. The system of claim 19, wherein the module access request includes one of a read request and a write request.

21. The system of claim 19, wherein the register slave resumes monitoring of the specified module address after completing the module access request received from the register master.

* * * * *

UNITED STATES PATENT AND TRADEMARK OFFICE
CERTIFICATE OF CORRECTION

PATENT NO. : 7,376,771 B1
APPLICATION NO. : 11/104547
DATED : May 20, 2008
INVENTOR(S) : Richard Brabant et al.

It is certified that error appears in the above-identified patent and that said Letters Patent is hereby corrected as shown below:

In column 8, line 17, delete "slv_mwr" and insert -- slv_rnwr --, therefor.

In column 8, line 37, delete "slv_mwr" and insert -- slv_rnwr --, therefor.

In column 9, line 6, delete "slvmmwr" and insert -- slv_rnwr --, therefor.

In column 9, line 24, delete "slv_mwr" and insert -- slv_rnwr --, therefor.

In column 9, line 38, delete "mon_add_up_jeg" and insert
-- mon_add_up_reg --, therefor.

In column 10, line 28, in Claim 1, after "data" insert -- , --. (second occurrence)

In column 10, line 30, in Claim 1, after "address" insert -- , --.

In column 11, line 4, in Claim 8, after "address" insert -- , --.

Signed and Sealed this

Twenty-ninth Day of July, 2008

JON W. DUDAS
*Director of the United States Patent and Trademark Office*